(12) United States Patent
Chen et al.

(10) Patent No.: US 12,745,133 B2
(45) Date of Patent: Sep. 22, 2026

(54) DATA TRANSMISSION METHOD AND APPARATUS, AND TERMINAL

(71) Applicant: VIVO MOBILE COMMUNICATION CO., LTD., Chang'an (CN)

(72) Inventors: Li Chen, Chang'an (CN); Dongru Li, Chang'an (CN)

(73) Assignee: VIVO MOBILE COMMUNICATION CO., LTD., Chang'an (CN)

( * ) Notice: Subject to any disclaimer, the term of this patent is extended or adjusted under 35 U.S.C. 154(b) by 0 days.

(21) Appl. No.: 18/626,042

(22) Filed: Apr. 3, 2024

(65) Prior Publication Data

US 2024/0284255 A1 Aug. 22, 2024

Related U.S. Application Data

(63) Continuation of application No. PCT/CN2022/124911, filed on Oct. 12, 2022.

(30) Foreign Application Priority Data

Oct. 19, 2021 (CN) ......................... 202111217889.5

(51) Int. Cl.
*H04W 28/26* (2009.01)
*H04W 28/02* (2009.01)
*H04W 28/06* (2009.01)

(52) U.S. Cl.
CPC ....... *H04W 28/06* (2013.01); *H04W 28/0268* (2013.01)

(58) Field of Classification Search
None
See application file for complete search history.

(56) References Cited

U.S. PATENT DOCUMENTS 10,917,817 B2 2/2021 Eriksson et al.
11,064,059 B2 7/2021 Yang et al.
(Continued)

FOREIGN PATENT DOCUMENTS

CN 108419275 A 8/2018
CN 110972195 A 4/2020
(Continued)

OTHER PUBLICATIONS

Chinese Office Action on CN Patent Appl. No. 202111217889.5 dated Aug. 20, 2025.

(Continued)

*Primary Examiner* — Natisha D Cox
(74) *Attorney, Agent, or Firm* — Foley & Lardner LLP

(57) ABSTRACT

This application discloses a data transmission method and apparatus, and a terminal. The data transmission method includes: in a case that a first data unit or a terminal meets a preset discarding condition, discarding, by the terminal, a target data unit, or discarding or reserving the target data unit based on at least one of a priority of the target data unit and a corresponding requirement, where the target data unit includes a first data unit and/or a data unit associated with the first data unit. The technical solutions of embodiments of this application can reduce invalid data transmission, improve system resource utilization, and reduce a transmission delay of a data packet.

9 Claims, 3 Drawing Sheets

(56) References Cited

U.S. PATENT DOCUMENTS

| | | | | |
|---|---|---|---|---|
| 2011/0164560 | A1 | 7/2011 | Ki et al. | |
| 2015/0003242 | A1* | 1/2015 | Han | H04L 47/24 370/230 |
| 2016/0112896 | A1 | 4/2016 | Karampatsis et al. | |
| 2016/0345198 | A1 | 11/2016 | Lee et al. | |
| 2020/0084668 | A1* | 3/2020 | Eriksson | H04W 28/14 |
| 2021/0006644 | A1* | 1/2021 | Yang | H04L 47/32 |
| 2021/0227531 | A1 | 7/2021 | Song et al. | |

FOREIGN PATENT DOCUMENTS

| | | | |
|---|---|---|---|
| CN | 111385221 | A | 7/2020 |
| CN | 113472683 | A | 10/2021 |
| CN | 113923712 | A | 1/2022 |
| CN | 113923713 | A | 1/2022 |
| WO | WO-2022/213923 | A1 | 10/2022 |

OTHER PUBLICATIONS

International Search Report on PCT Appl. No. PCT/CN2022/124911 dated Jan. 3, 2023.

Supplementary European Search Report on EP Patent Appl. No. 22882723.4 dated Jan. 2, 2025.

CN Office Action on CN Appl. No. 202111217889.5 dated Apr. 8, 2026 (20 pages).

CN Office Action on CN Appl. No. 202111217889.5 dated Jun. 24, 2026 (17 pages).

* cited by examiner

DATA TRANSMISSION METHOD AND APPARATUS, AND TERMINAL

CROSS-REFERENCE TO RELATED APPLICATIONS

This application is a Bypass Continuation Application of PCT International Application No. PCT/CN2022/124911 filed on Oct. 12, 2022, which claims priority to Chinese Patent Application No. 202111217889.5, filed on Oct. 19, 2021 in China, which is incorporated herein by reference in its entirety.

TECHNICAL FIELD

This application relates to the field of communication technologies, and in particular, relates to a data transmission method and apparatus, and a terminal.

BACKGROUND

Extended reality (XR) refers to all real-and-virtual combined environments and human-machine interactions generated by using a computer technology and a wearable device. XR includes representative forms such as augmented reality (AR), mixed reality (MR), and virtual reality (VR), and interpolation areas between them. Levels of the virtual world range from partial sensory input to fully immersive virtual reality. A key of XR is expansion of human experience, especially experience related to sense of presence (represented by VR) and cognitive acquisition (represented by AR).

In a wireless network in a related technology, discarding of a data packet is controlled by a discard timer, and a characteristic of an XR service is not considered, and data packets of different priorities or different requirements cannot be differentiated, which may cause some invalid data transmission, waste system resources, or cause a latency of data to increase.

SUMMARY

According to a first aspect, an embodiment of this application provides a data transmission method, including:

in a case that a first data unit or a terminal meets a preset discarding condition, discarding, by the terminal, a target data unit, or discarding or reserving the target data unit based on at least one of a priority of the target data unit and a corresponding requirement, where the target data unit includes a first data unit and/or a data unit associated with the first data unit.

According to a second aspect, an embodiment of this application provides a data transmission apparatus, including:

a processing module, configured to: in a case that a first data unit or a terminal meets a preset discarding condition, discard a target data unit, or discard or reserve the target data unit based on at least one of a priority of the target data unit and a corresponding requirement, where the target data unit includes a first data unit and/or a data unit associated with the first data unit.

According to a third aspect, a terminal is provided, where the terminal includes a processor, a memory, and a program or an instruction that is stored in the memory and that can run on the processor, where when the program or the instruction is executed by the processor, the steps of the method according to the first aspect are implemented.

According to a fourth aspect, a terminal is provided, including a processor and a communication interface. The processor is configured to: in a case that a first data unit or a terminal meets a preset discarding condition, discard a target data unit, or discard or reserve the target data unit based on at least one of a priority of the target data unit and a corresponding requirement, where the target data unit includes a first data unit and/or a data unit associated with the first data unit.

According to a fifth aspect, a readable storage medium is provided, where the readable storage medium stores a program or an instruction, and when the program or the instruction is executed by a processor, the steps of the method according to the first aspect are implemented.

According to a sixth aspect, a chip is provided. The chip includes a processor and a communication interface, the communication interface is coupled to the processor, and the processor is configured to run a program or an instruction to implement steps of the method according to the first aspect.

According to a seventh aspect, a computer program/program product is provided, where the computer program/program product is stored in a non-volatile storage medium, and the computer program/program product is executed by at least one processor to implement steps of the method according to the first aspect.

According to an eighth aspect, a communication device is provided, configured to perform steps of the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. A new radio (NR) system is described in the following description for illustrative purposes, and the NR terminology is used in most of the following description, although these technologies can also be applied to applications other than the NR system application, such as the $6^{th}$ generation (6G) communication system.

Figures 1, 2:
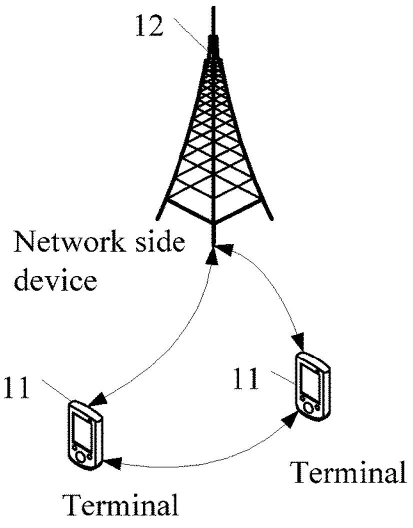
FIG. 1 is a schematic diagram of a wireless communication system.
FIG. 2 is a schematic flowchart of a data transmission method according to an embodiment of this application.

FIG. 1 is a block diagram of a wireless communication system to which the embodiments of this application can be applied. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a smartwatch, a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (Wi-Fi) node, a transmitting receiving point (TRP), or another appropriate term in the art. Provided that a same technical effect is achieved, the base station is not limited to a specified technical term. It should be noted that, in the embodiments of this application, only a base station in an NR system is used as an example, but a specific type of the base station is not limited. The network side device may be a position management device, such as a position management function (LMF or E-SLMC).

For a VR service, relatively dense small data packets are mainly transmitted on an uplink. The small data packets may carry information such as a gesture and control, and serve as input and reference for downlink presentation data. On a downlink, multimedia data such as video and audio are mainly transmitted. Through timely receiving and presentation of the multimedia data, immersive experience is provided to a user. Downlink video data is used as an example. A data packet arrives in a periodic manner or in a quasi-periodic manner, a data rate may reach dozens or even hundreds of Mbps, a typical value of frames per second (FPS) is 60 or 120, and an interval between adjacent data packets is approximately 1/FPS seconds. The data generally needs to be successfully transmitted within 10 ms on an air interface, and a transmission success rate is required to be not less than 99% or even to be 99.9%.

For an AR service, in addition to the foregoing transmission of dense small data packets, on an uplink, multimedia data such as video and audio may also be transmitted. A service characteristic of the AR service is similar to that of the downlink. Generally, a data rate is relatively low, for example, a maximum of dozens of Mbps, and a time limit of air interface transmission may also be relaxed. For example, transmission generally needs to be performed successfully within 60 ms. Data transmission characteristics of the downlink are basically the same as those of the VR service.

The user wants to interact and operate in an extended reality, where the operation and interaction include an action, a gesture, and a body reaction. Degree of Freedom (DoF) describes a quantity of independent parameters used to define movement of a viewport in 3D space.

In an application scenario of XR, in virtual reality experience, a user may obtain information of a new angle of view by performing actions such as turning the head. In this case, the head-turning action of the XR user may be notified to a base station by sending an uplink signal. After receiving the uplink signal, the base station schedules required downlink data for the XR user for use.

An XR service mainly includes video data, audio data, and some control signaling and special data that have a control function. In a wireless network, transmission of an XR service mainly includes uplink and downlink video/audio data transmission and exchange between user equipment (UE) and the wireless network (such as the LTE/NR). When transmitting video and audio data, the UE needs to transmit, in an uplink manner by using a wireless network, some control signaling and special data that have a control function, so as to generate, process, and perform downlink wireless transmission of video and audio service data in an XR service sent by a control network to the UE.

The control information and special data that have a control function include some service control data generated by a UE XR application encoder and control data information included in a service transmission protocol. For example,

- from a perspective of an application layer, the control information and special data may include (but are not limited to):
- an I frame or an Instantaneous Decoding Refresh (IDR) frame or a non Field of view (non-FOV) frame generated by a video encoder; and
- user behavior data collected by a sensor, such as pose/control data, where the network may determine, by receiving the data, a user behavior, for example, an action such as a head-turning action of the user, so as to adjust video data content to be sent.

For a perspective of a transmission protocol layer, the control information and special data may include:

- transmission control protocol (TCP) acknowledgement (ACK) signaling (which is a TCP feedback) for downlink audio/video service transmission, where the network needs to determine, based on whether a corresponding video/audio frame is acknowledged by the UE, whether a subsequent frame can be further sent; and
- Real-Time Transport Control Protocol (RTCP) ACK signaling, which is used to control control signaling of real-time data transmission, to acknowledge a real-time performance requirement and time synchronization of service data transmission.

The network usually needs to receive, from the UE in a timely and reliable manner, these control signaling and special data that have a control function, to obtain a transmission status of a current service and related necessary control information. An application server needs to further generate, based on the information, video and audio service data that needs to be subsequently transmitted, and transfer the video and audio service data to the wireless network for processing and transmission, and finally the service data is sent to the UE in a downlink manner.

As discussed by an XR standard project, the XR service is a quasi-periodic service, that is, service packets arrive at equal intervals, and the interval is a small floating point type number (non-positive integer) (for example, 30 FPS (FPS refers to a quantity of frames per second)→33.33 ms, 60 FPS→16.67 ms, and 120 FPS→8.33 ms). In addition, an XR service has a high requirement for a delay, and an air interface transmission delay budget (PDB) is required to be about 10 ms.

However, because a service sent from the server side to the base station side needs to have a transmission delay, or the like, some jitter occurs in an XR service packet in terms of time when the packet arrives at the base station side, that is, on a basis of a quasi-period, a packet for each service arrives at a time with an offset within a specific range, and the offset is referred to as jitter. The offset of the jitter follows a truncated Gaussian distribution, and a range of the offset is ±4 ms relative to a time position reached by a quasi-periodic service packet.

For example, a time at which a quasi-period packet reaches a base station side is n (for example, in a unit of ms). Because of impact of jitter, an actual arrival time of the packet is n+j, where j is magnitude of jitter, and for example, the jitter is −1 ms, it indicates that an actual arrival time of the packet that should arrive at the time n is n−1 ms.

To help a network side to perform uplink scheduling based on uplink to-be-transmitted data, a buffer status report (BSR) reporting mechanism is introduced starting from LTE, and the UE reports, to the base station, an amount of uplink to-be-transmitted data corresponding to each logical channel group. This mechanism is basically followed in NR.

A granularity of BSR reporting is a logical channel group (LCG). Each established logical channel may be configured with one home logical channel group. The NR supports configuring a maximum of eight logical channel groups for a single UE at the same time.

The BSR is triggered based on the following events:

(1) New uplink to-be-transmitted data arrives on a logical channel of a logical channel group, and a priority of the logical channel is higher than a priority of a previous logical channel that has uplink to-be-transmitted data. Alternatively, before the new data arrives, all logical channels do not have uplink to-be-transmitted data, and in this case, a regular (Regular) BSR is triggered.

(2) When an uplink newly transmitted transport block (TB) is organized, a quantity of padding bits in the newly transmitted TB is greater than or equal to a quantity of bits occupied (by a subheader corresponding to a single BSR MAC CE+) (that is, the padding bits in the newly transmitted TB may further hold bits corresponding to a single BSR Medium Access Control (MAC) Control Element (CE)), and in this case, a padding BSR is triggered.

(3) A retxBSR-Timer timer expires and uplink to-be-transmitted data exists on at least one logical channel. In this case, a regular BSR is triggered.

(4) A periodicBSR-Timer timer expires. In this case, a periodic BSR is triggered.

When the regular BSR is triggered and no uplink resource is used for new transmission, the UE triggers a scheduling request (SR) to request an uplink new transmission resource from the network through physical uplink control channel (PUCCH) transmission or random access.

When the periodic BSR is triggered, the UE includes only one BSR MAC CE in a constructed uplink TB when there is an uplink new transmission resource, but does not actively request an uplink new transmission resource from the network by triggering an SR.

When the padding BSR is triggered, the UE directly includes one BSR MAC CE in the uplink newly transmitted TB.

This embodiment relates to an uplink data processing and sending procedure of a wireless communication Access Statum (AS) of the UE. The following describes the related technologies of main protocol layers and related functions.

(1) Packet Data Convergence Protocol (PDCP) Layer and Radio Bearer

Service data generated by an application layer (APP) of the UE is classified into different service data streams based on a quality-of-service (QoS) requirement corresponding to the service data, and each service data stream corresponds to a same or similar QoS requirement. In the NR system, the service data stream corresponds to a QoS flow, and in the LTE system, the service data stream corresponds to an Evolved Packet System (EPS) bearer.

The service data is transferred to the AS in a form of a data packet, and is further mapped to one radio bearer based on a QoS flow (NR) or an EPS bearer (LTE) corresponding to the service data. One radio bearer includes one PDCP entity (PDCP protocol layer processing entity), one radio link control (RLC) entity (PDCP protocol layer processing entity), and a corresponding logical channel (located at a MAC protocol layer).

After one data packet transferred to the AS is mapped to one radio bearer, the data packet is transferred to a corresponding PDCP entity in a form of a PDCP service data unit (SDU) for processing. The PDCP entity generates a corresponding PDCP protocol data unit (PDU) for each arriving PDCP SDU, and sets a PDCP sequence number (SN) to indicate a transmission sequence corresponding to each PDCP SDU in the PDCP entity and a corresponding PDCP PDU. A value of the PDCP SN is set based on an order in which the PDCP SDU is transferred to the PDCP entity, and a PDCP SDU that arrives first is transmitted first. Specifically, the PDCP entity maintains an internal variable TX_NEXT, which represents a total quantity of PDCP PDUs transmitted by the PDCP entity and is used to set a value of the PDCP SN. When the PDCP entity is established, the PDCP entity initializes the PDCP SN to 0, and each time a PDCP SDU is transferred from an upper layer to a corresponding PDCP entity, the PDCP entity actually sets an SN of a PDCP PDU corresponding to the PDCP SDU to TX_NEXT, and adds TX NEXT to 1. Then, the PDCP entity adds a header file to each PDCP SDU to generate a corresponding PDCP PDU, where the PDCP PDU includes an SN value set for the PDCP PDU. The PDCP entity generally transfers the PDCP PDU in sequence to a lower protocol layer (RLC) for subsequent processing and transmission based on an order of SNs included in the PDCP PDU. The SN is a sequence number, indicating a transmission sequence of each PDCP SDU. An overall principle is that the earlier the PDCP SDU arrives at the PDCP entity, the smaller the SN value, and the earlier the PDCP SDU is transmitted.

(2) Radio Link Control (RLC) Layer

A PDCP PDU transferred from the PDCP entity to a corresponding RLC entity is cached in a buffer of the UE as a to-be-transmitted RLC SDU and is further processed by the RLC entity. Specifically, when a specific transmission resource is allocated to a logical channel corresponding to an RLC entity, the RLC entity determines, based on an amount of data that can be held by the allocated transmission resource and a data amount of a to-be-transmitted RLC SDU in the buffer, which RLC SDU may be multiplexed into the allocated transmission resource for transmission.

For one or more RLC SDUs that are determined by the RLC entity and that can be completely multiplexed into the allocated transmission resource, the RLC entity adds corresponding RLC header files to the RLC SDU, generates a corresponding RLC PDU, and transfers the corresponding RLC PDU to a lower protocol layer (MAC) for subsequent processing and transmission. After the foregoing complete RLC PDU is multiplexed, if there is still a specific resource remaining but not enough to multiplex a complete RLC SDU (that is, an amount of data that can be supported by the resource is less than an amount of data required for multiplexing a next RLC SDU), the RLC entity performs segmentation processing, that is, adds a header file to a part of data of a next to-be-transmitted RLC SDU, generates an RLC PDU, and transfers the RLC PDU to a lower protocol layer for subsequent processing and transmission.

For this segmented RLC SDU, a remaining part remains in the buffer of the UE, and is transmitted until a next uplink transmission resource arrives.

(3) Medium Access Control (MAC) Layer and Logical Channel

An RLC entity corresponding to each radio bearer further corresponds to one logical channel at the MAC layer. After an uplink grant of an uplink transmission resource is allocated to the UE, a MAC entity of the UE further allocates a resource of this uplink transmission among a plurality of logical channels. Specifically, each logical channel corresponds to one logical channel priority. The MAC entity of the UE allocates, based on a resource allocation mechanism of logical channel prioritization (LCP), an available transmission resource for current uplink transmission to each logical channel in descending order of logical channel priorities, and the available transmission resource corresponds to an amount of data that can be transmitted on each logical channel.

As described above, based on the transmission resource allocated to each logical channel, the corresponding RLC entity may transfer one or more RLC PDUs to a corresponding logical channel at the MAC layer. The MAC layer uses these RLC PDUs obtained by each logical channel from the RLC entity as to-be-transmitted MAC SDUs, adds a corresponding MAC header file to a corresponding logical channel to form a MAC subPDU to the corresponding logical channel, and multiplexes the MAC subPDU into an entire transmission resource as data sent by this logical channel for current uplink transmission. The MAC subPDUs of the plurality of logical channels are combined to finally form one MAC PDU, which is used as an uplink data packet and is transmitted to the network by using a wireless signal.

It should be noted that, because the RLC entity performs segmentation processing (as described above) on the RLC SDU, for each uplink transmission resource obtained by the UE, the UE needs to first multiplex a remaining part of the RLC SDU that has been segmented in previous transmission and has not been transmitted, into the resource for transmission, and then can transmit a data packet corresponding to subsequent another RLC SDU.

In general, in LTE and NR networks in related technologies, the UE generally implements the foregoing uplink data processing and transmission process by using a principle "data that arrives first is transmitted first" for data of each radio bearer. Specifically, for each radio bearer, the UE processes the data packet at each protocol layer according to a sequence in which the data packet (SDU) is transmitted to a corresponding entity at the current layer, and transmits the processed data packet (PDU) to a next protocol layer in sequence. That is, for a data packet that is first transferred to the AS, a corresponding PDCP entity sets a previous PDCP SN value for the data packet, so that the data packet is first processed at each of the foregoing protocol layers, and is first transmitted by being multiplexed into an uplink resource. A later PDCP SN value is allocated to a data packet that arrives later, and the data packet is generally processed, multiplexed, and transmitted at the foregoing protocol layers after the data packet that arrives first. This also means that for data packets mapped to each radio bearer, the UE ultimately performs a sequential transmission mechanism in a sequence in which the data packets arrive at the AS.

This principle is mainly based on a transmission latency: In a wireless network in a related technology, a data transmission latency requirement in each radio bearer is basically the same, and in a wireless network in the related technology, the AS of the UE is not allowed to obtain specific content of each data packet, and differential processing for each data packet cannot be performed. Therefore, performing uplink processing, scheduling, and transmission of the data packet based on an order of arrival of the data packet are relatively proper in the related art from a perspective of ensuring a latency as far as possible.

For a discard timer at a PDCP layer, only a data radio bearer (DRB) has a discard timer. A transmit side starts one new timer for each SDU from an upper layer, and discards the SDU after expiration, so as to prevent sending buffer congestion. Specific duration of this timer is configured by upper-layer RRC. Specifically, when a PDCP SDU sent by an upper layer is received, a PDCP entity on the transmit side starts a discard timer associated with the PDCP SDU. When the discard timer associated with the PDCP SDU expires, or when the PDCP SDU is successfully transmitted (that is, a PDCP status report acknowledges successful transmission), the PDCP entity on the transmit side needs to discard the PDCP SDU and a corresponding PDCP data PDU. If the PDCP data PDU has been transferred to a lower layer, it is required to instruct the lower layer to discard the PDCP data PDU. For a signalling radio bearer (SRB), when the upper layer requests to discard one PDCP SDU, the PDCP entity needs to discard all stored PDCP SDUs and PDCP PDUs. Certainly, discarding a PDCP SDU that is already associated with the PDCP SN may bring an SN gap in the transmitted PDCP data PDU. In this way, a corresponding PDCP re-ordering latency is added to a receiving PDCP entity. In this case, it is ensured, based on implementation of the UE, how to minimize the SN gap after the SDU is discarded.

Currently, the wireless network can support XR service transmission of the user. As described above, for an XR service requested by the UE of the user, bidirectional interactive data transmission is performed between the UE of the user and the network. An application server on the network side generates XR service data such as video and audio, and transmits the XR service data to the UE in a downlink manner through a wireless network. The UE side also needs to send, to the network, XR service data information such as video and audio that are generated by the application server on the network side and the foregoing control signaling and special data that have a control function. Generation and transmission of XR service data on the network side are controlled in turn by using the control information/special data. The generation and transmission of the downlink XR service data on the network side depends on whether uplink control information on the UE side can be sent to the network in time and effectively.

In a current solution, discarding of an SDU of each PDCP is independently controlled by a discard timer, and a characteristic of an XR service is not considered. In the XR service or a CG service, different data packets or different layers have different requirements or characteristics. If the discard timer controls discarding of data packets in a unified manner, data packets having different priorities or different requirements may not be treated differently. In this case, a discarding design of independent data packets in the related art may cause some invalid data transmission, waste system resources, or cause a latency of some data to increase.

An embodiment of this application provides a data transmission method. As shown in FIG. 2, the method includes the following steps.

Step 101: In a case that a first data unit or a terminal meets a preset discarding condition, the terminal discards a target data unit, or discards or reserves the target data unit based on at least one of a priority of the target data unit and a corresponding requirement, where the target data unit includes a first data unit and/or a data unit associated with the first data unit.

In this embodiment of this application, in a case that the first data unit or the terminal meets the preset discarding condition, the target data unit associated with the first data unit is discarded, or the target data unit is discarded or reserved based on the priority of the target data unit and/or the corresponding requirement. After a specific data unit is discarded, a data unit associated with the specific data unit cannot be successfully transmitted or demodulated. Therefore, the specific data unit can be discarded in advance, so that invalid data transmission can be reduced in advance, system resources can be saved, resource utilization of the system can be improved, transmission efficiency of another data packet is also ensured, and a transmission delay of the data packet is reduced.

The first data unit includes a first group and/or a first data packet, and the target data unit includes a group and/or a data packet. The first data unit is associated with the target data unit, and this means that a first operation of one of the first data unit and the target data unit depends on the other. The first operation includes at least one of the following: transmission, decoding, demodulation, receiving, display, or integrity verification.

In some embodiments, the preset discarding condition includes at least one of the following:

a first timer expiring;

the first data unit being a data unit in a first target-type group or the first data unit being a first target-type group;

the first data unit being a first target-type data packet or the first data unit being a group to which a first target-type data packet belongs;

receiving, by the terminal, a first indication configured by a network side device or indicated by a first protocol layer, where the first protocol layer includes at least one of the following: an application layer, an Internet Protocol (IP) layer, a radio resource control (RRC) layer, an SDAP layer, a PDCP layer, an RLC layer, and a MAC layer, and the network side device includes a base station device, a core network device (for example, an access and mobility management function (AMF), an application function (AF), a user plane function (UPF)), a server end, and a data source side;

a priority of the first data unit, a priority of a PDU corresponding to the first data unit, or a priority of an SDU corresponding to the first data unit being lower than a preset first threshold, for example, a priority identifier of a data packet, a PDU, or an SDU being lower than a threshold, where data packets of different priorities may be transmitted in one QoS flow or may be in a same QoS flow, but some data packets are relatively important, for example, an IDR (Instantaneous Decoding Refresh) frame;

the first data unit being successfully transmitted; and determining, by the terminal based on first target information, that the first data unit needs to be discarded, where the first target information is used to indicate at least one of the following:

whether the terminal supports carrier aggregation (CA) or dual connectivity (DC), for example, the terminal not supporting carrier aggregation CA or dual connectivity DC;

whether carrier aggregation CA or dual connectivity DC is configured for the terminal, for example, the network side device having not configured carrier aggregation CA or dual connectivity DC for the terminal;

whether carrier aggregation CA or dual connectivity DC is activated for the terminal, for example, the terminal having not activated carrier aggregation CA or dual connectivity DC;

a resource configured by the network side device for the terminal or a resource used to transmit the first data unit, for example, a resource being insufficient, and a resource configured by the network side device for the terminal being less than or equal to a preset threshold, or a resource used to transmit the first data unit being less than or equal to a preset threshold;

memory or cache space of the terminal, for example, memory or cache space of the terminal being insufficient, and a size of a layer 1, a layer 2, a layer 3, and a radio resource control cache being less than a preset threshold;

a capability of the terminal, for example, the capability of the terminal being insufficient, and one or more capabilities being lower than a preset value;

channel quality of the terminal or channel quality used to transmit the first data unit, for example, the channel quality being not good enough, and channel measurement performance being lower than or equal to a preset threshold, where the measurement performance includes reference signal received power (RSRP), reference signal received quality (RSRQ), a signal-to-interference plus noise ratio (SINR), and the like;

a size of the first data unit, a size of a PDU corresponding to the first data unit, a size of an SDU corresponding to the first data unit, a size of a BSR corresponding to the first data unit, or a size of an SR corresponding to the first data unit, for example, any one of the foregoing several items being greater than or equal to a preset threshold;

a queue of the first data unit or a to-be-transmitted data queue of the terminal, for example, a quantity of data packets of a first target data queue of the terminal being greater than or equal to a preset threshold, where the first target data queue includes the queue of the first data unit or the to-be-transmitted data queue;

a size of a queue of the first data unit or a size of a to-be-transmitted data queue of the terminal, for example, a total size of data packets of a first target data queue of the terminal being greater than or equal to a preset threshold, where the first target data queue includes the queue of the first data unit or the to-be-transmitted data queue;

a latency requirement of the terminal or the first data unit; or a PDB requirement of the terminal or the first data unit, for example, a latency or a PDB of the terminal or a data packet, or a waiting time reaching a preset threshold or a preset timer;

a packet error rate of the first data unit, a packet error rate of a PDU corresponding to the first data unit, or a packet error rate of an SDU corresponding to the first data unit, for example, a packet error rate of a data packet, a PDU, or an SDU being greater than or equal to a preset threshold, where in this case, a feedback mechanism is required, which may not be limited to a UE side, for example, a scenario such as a sidelink may be considered; and a latency of the target data unit, a latency of a PDU corresponding to the target data unit, or a latency of an SDU corresponding to the target data unit, for example, any one of the foregoing several items being greater than or equal to a preset threshold, or a delay difference of an associated data unit being greater than or equal to a preset threshold.

In some embodiments, the preset discarding condition may further include at least one of the following:

the first timer expiring, and the first timer being corresponding to the target data unit; and the first data packet or a group in which the first data packet is located having been successfully transmitted.

The first timer is associated with the first data packet, or is associated with the group in which the first data packet is located, or is associated with a second data packet, or is associated with a group in which the second data packet is located, or is associated with a second group.

The second data packet includes at least one of the following:

1. Some or remaining or all data packets in the group in which the first data packet is located;
2. some or all of data packets associated with the first data packet;
3. some or remaining or all data packets in a group in which a data packet associated with the first data packet is located;
4. some or remaining or all data packets in other groups or all groups associated with the group in which the first data packet is located;
5. some or all data packets corresponding to the timer;
6. some or all data packets associated with the data packets corresponding to the timer;
7. some or remaining or all data packets in some or all groups corresponding to the timer; and
8. some or remaining or all data packets in other groups or all groups associated with some or all the groups corresponding to the timer.

The second group includes at least one of the following:

1. the group in which the first data packet is located;
2. a group in which a data packet associated with the first data packet is located;
3. other groups or all groups associated with the group in which the first data packet is located;
4. some or all groups corresponding to the timer; and
5. other groups or all groups associated with some or all the groups corresponding to the timer.

In some embodiments, the preset discarding condition is configured by a network side device or indicated by a first protocol layer, where the first protocol layer includes at least one of the following: an application layer, an IP layer, an RRC layer, an SDAP layer, a PDCP layer, an RLC layer, a MAC layer, and a physical (PHY) layer. The first protocol layer herein may be on a terminal side, or may be on a network side. For example, for a downlink data packet, the preset discarding condition is indicated by using a first protocol layer on the network side, and for an uplink data packet, the preset discarding condition is indicated by a first protocol layer on the terminal side. The network side includes a base station device, a core network device (such as an AMF, an AF, and a UPF), a server end, and a data source side.

In some embodiments, the first data unit is a first data packet or a first group, and a data packet associated with the first data unit includes at least one of the following:

at least some data packets in the first group, where the first group is a group in which the first data packet is located;

at least some data packets associated with the first data packet or the first group; and at least some data packets in a second group, where the second group is associated with the first data packet or the first group.

After the first data unit is discarded, a data packet associated with the first data unit cannot be successfully transmitted or demodulated. Therefore, the first data unit can be discarded in advance, so that invalid data transmission can be reduced in advance, system resources can be saved, resource utilization of the system can be improved, transmission efficiency of another data packet is also ensured, and a transmission delay of the data packet is reduced.

In some embodiments, the first data unit is a first data packet or a first group, and a data packet associated with the first data unit includes at least one of the following:

at least some data packets corresponding to the first timer;

at least some data packets associated with a fifth data packet, where the fifth data packet corresponds to the first timer;

at least some data packets in a fifth group, where the fifth group corresponds to the first timer; and at least some data packets in a sixth group associated with the fifth group.

After the first data unit is discarded, a data packet associated with the first data unit cannot be successfully transmitted or demodulated. Therefore, the first data unit can be discarded in advance, so that invalid data transmission can be reduced in advance, system resources can be saved, resource utilization of the system can be improved, transmission efficiency of another data packet is also ensured, and a transmission delay of the data packet is reduced.

In some embodiments, the first data unit is a first data packet or a first group, and a group associated with the first data unit includes at least one of the following:

a first group, where the first group is a group in which the first data packet is located;

a group in which a second data packet is located, where the second data packet is associated with the first data packet or the first group; and a group associated with the first group.

After the first data unit is discarded, a group associated with the first data unit cannot be successfully transmitted or demodulated. Therefore, the first data unit can be discarded in advance, so that invalid data transmission can be reduced in advance, system resources can be saved, resource utilization of the system can be improved, transmission efficiency of another data packet is also ensured, and a transmission delay of the data packet is reduced.

In some embodiments, the first data unit is a first data packet or a first group, and a group associated with the first data unit includes at least one of the following:

a group corresponding to the first timer;

a group associated with a fifth group, where the fifth group corresponds to the first timer; and a group in which a data packet corresponding to the first timer is located; and a group associated with the data packet corresponding to the first timer.

After the first data unit is discarded, a group associated with the first data unit cannot be successfully transmitted or demodulated. Therefore, the first data unit can be discarded in advance, so that invalid data transmission can be reduced in advance, system resources can be saved, resource utilization of the system can be improved, transmission efficiency of another data packet is also ensured, and a transmission delay of the data packet is reduced.

In some embodiments, the first target-type group meets at least one of the following:

the first target-type group being a low-priority group, where the low priority may be lower than a preset priority;

the first target-type group being not a high-priority group, where the high priority may be higher than a preset priority;

a priority of the first target-type group being lower than a preset priority;

the first target-type group being not a low latency requirement group, where the low latency requirement may be lower than a preset latency requirement;

a latency requirement of the first target-type group being lower than a preset latency requirement;

a PoD requirement of the first target-type group being lower than a preset PoD requirement;

the first target-type group being a P-frame group or a P slice in a service;

the first target-type group being a B-frame group or a B slice in a service;

the first target-type group being an enhanced layer group in a service;

the first target-type group being a non-Fov frame group in a service;

the first target-type group being a low QoS requirement group, where the low QoS requirement may be lower than a preset QoS requirement;

a QoS requirement of the first target-type group being lower than a preset QoS requirement;

a priority of a QoS flow mapped by the first target-type group being a low priority or being lower than a preset priority;

a priority of a logical channel (LCH) mapped by the first target-type group being a low priority or being lower than a preset priority;

at least some data units in the first target-type group not having an association with another data unit in the first target-type group, for example, there being an association between less than a preset proportion of data units and another data unit in the first target-type group;

the another data unit not depending on at least some data units in the first target-type group, for example, less than a preset proportion of other data units depending on a data unit in the first target-type group;

at least some data packets or a group associated with the first target-type group having been successfully transmitted, for example, all or more than a preset proportion of data packets or groups associated with the first target-type group having been successfully transmitted;

at least some data packets or a group that depends on the first target-type group having been successfully transmitted, for example, all or more than a preset proportion of data packets or groups that depend on the first target-type group having been successfully transmitted;

at least some data packets in the first target-type group having been successfully transmitted, for example, all or more than a preset proportion of data packets in the first target-type group having been successfully transmitted;

the first target-type group being a group in which the first target-type data packet is located;

a group associated with the first target-type data packet; and a group that depends on the first target-type data packet.

In a specific example, the first target-type group includes at least one of the following: a low-priority group, a P-frame group, a group having a relatively low latency/PoD requirement, an enhanced layer group, a non-FoV layer group, and a group corresponding to a low QoS requirement. Further, the first target-type group includes at least one of the following: a group having a priority lower than a preset priority, a group having a latency/PoD requirement lower than a preset latency/PoD requirement, and a group having a QoS requirement lower than a preset QoS requirement.

The first target-type group is not any one of the following: a high-priority group, an I-frame group, an IDR-frame group, a group having a relatively high latency/PoD requirement, a basic layer group, an FoV layer group, and a group corresponding to a high QoS requirement. Further, the first target-type group is not any one of the following: a group having a priority higher than a preset priority, a group having a latency/PoD requirement higher than a preset latency/PoD requirement, and a group having a QoS requirement higher than a preset QoS requirement.

In a specific example, the first target-type group meets the following: If the second data packet or the second group that is associated with the first group or the data packet in the first group has been successfully processed or failed to be processed or discarded, or does not need (or temporarily does not need) to depend on the first group, or has relied on the first group for corresponding processing, the first group is the first target-type group. Being successfully processed or failing to be processed or discarding includes: a part or all of the second data packet or the second group or an association part has been successfully processed or failed to be processed or discarded, and the part or the association part includes a preset proportion. Being successfully processed or failing to be processed includes sending, receiving, demodulation, decoding, display, or submission, that is, submission to other upper or lower layers.

In some embodiments, the preset discarding condition further includes at least one of the following:

the first data unit being a data unit associated with the first target-type group; and the first data unit being a data unit that depends on the first target-type group.

In some embodiments, the first target-type data packet meets at least one of the following:

the first target-type data packet being a data packet in the first target-type group;

the first target-type data packet being associated with the first target-type group;

the first target-type data packet depending on the first target-type group;

a data packet in a group associated with the first target-type group;

a data packet in a group that depends on the first target-type group;

a priority of the first target-type data packet being a low-priority data packet, where the low priority may be lower than a preset priority;

the priority of the first target-type data packet being lower than a preset priority;

a latency requirement of the first target-type data packet being a low latency requirement, where the low latency requirement may be lower than a preset latency requirement;

the latency requirement of the first target-type data packet being lower than a preset latency requirement;

a PoD requirement of the first target-type group being lower than a preset PoD requirement;

the first target-type data packet being a P-frame data packet or a P slice data packet in a service;

the first target-type data packet being a B-frame data packet or a B slice data packet in a service;

the first target-type data packet being an enhanced layer data packet in a service;

the first target-type data packet being a non-Fov frame data packet in a service;

a QoS requirement of the first target-type data packet being a low QoS requirement, where the low QoS requirement may be lower than a preset QoS requirement;

the QoS requirement of the first target-type data packet being lower than a preset QoS requirement;

a priority of a QoS flow mapped by the first target-type data packet being a low priority or being lower than a preset priority, or being not a high priority;

a priority of an LCH mapped by the first target-type data packet being a low priority or being lower than a preset priority, or being not a high priority;

at least some data packets in the first target-type data packet not having an association with another data packet in the first target-type group, for example, there being an association between less than a preset proportion of data packets and another data packet in the first target-type data packet;

the another data packet not depending on at least some data packets in the first target-type data packet, for example, less than a preset proportion of other data packets depending on at least some data packets in the first target-type data packet;

at least some data packets or a group associated with the first target-type data packet having been successfully transmitted, for example, more than a preset proportion of data packets or groups associated with the first target-type data packet having been successfully transmitted;

at least some data packets or a group that depends on the first target-type data packet having been successfully transmitted, for example, more than a preset proportion of data packets or groups that depend on the first target-type data packet having been successfully transmitted; and at least some data packets in the first target-type data packet having been successfully transmitted.

In a specific example, the first target-type data packet includes at least one of the following: a low-priority data packet, a P-frame data packet, a data packet having a relatively low latency requirement, an enhanced layer data packet, a non-FoV layer data packet, and a data packet corresponding to a low QoS requirement. Further, the first target-type data packet includes: a data packet having a priority lower than a preset priority, a data packet having a latency requirement lower than a preset latency requirement, and a data packet having a QoS requirement lower than a preset QoS requirement.

The first target-type data packet is not any one of the following: a high-priority data packet, an I-frame data packet, an IDR data packet, a data packet having a relatively high latency requirement, a basic layer data packet, an FoV layer data packet, and a data packet corresponding to a high QoS requirement.

Further, the first target-type data packet is not any one of the following: a data packet having a priority higher than a preset priority, a data packet having a latency requirement higher than a preset latency requirement, and a data packet having a QoS requirement higher than a preset QoS requirement (QoS may be based on a data packet level, or may be based on a frame level or a data packet set level or an application layer data unit level).

In this embodiment, the first target-type data packet meets the following: The second data packet or the second group that is associated with the first data packet or the group in which the first data packet is located has been successfully processed or failed to be processed or discarded, or does not need (or temporarily does not need) to depend on the first data packet, or has relied on the first data packet for corresponding processing. Being successfully processed or failing to be processed or discarding includes: a part or all of the second data packet or the second group or an association part has been successfully processed or failed to be processed or discarded. Being successfully processed or failing to be processed includes sending, receiving, demodulation, decoding, display, or submission, and the submission indicates submission to other upper or lower layers.

In some embodiments, the preset discarding condition further includes at least one of the following:

the first data unit being a data packet associated with the first target-type data packet;

the first data unit being a data packet that depends on the first target-type data packet;

the first data unit being a data packet in a group associated with the first target-type data packet; and the first data unit being a data packet in a group that depends on the first target-type data packet.

In some embodiments, the first indication is used to indicate at least one of the following:

discarding the target data unit based on second target information, where in this way, whether to discard the target data unit may be determined by using the second target information, so as to avoid transmitting invalid data and save system resources; and discarding the target data unit based on no association or dependency, where when there is no association or dependency between data units, if discarding of a data unit does not affect transmission and demodulation of other data, the data unit may be discarded.

In some embodiments, the second target information is used to indicate at least one of the following:

memory or cache space of the terminal, for example, the memory or the cache space or available storage space of the terminal or storage space used for the data unit being less than a preset threshold, where the cache space or storage space includes L1, L2, and L3 buffers or soft buffers;

a capability of the terminal, for example, a specific capability of the terminal being lower than a preset value;

whether the terminal supports carrier aggregation CA or dual connectivity DC, where for example, the preset condition is that when the terminal does not support the CA or the DC, if the preset condition is met, the target data unit is discarded, and when the terminal supports the CA or the DC, the terminal stops discarding the target data unit;

whether carrier aggregation CA or dual connectivity DC is configured or activated for the terminal, where for example, when the CA or the DC is not configured for the terminal, or when the CA or the DC is not activated for the terminal, the terminal stops discarding the target data unit, and if there are enough resources configured by the network side device for the terminal or resources used to transmit the first data unit, for example, if there are enough channel resources, and a quantity of first target channel resources is greater than or equal to a preset threshold, the terminal stops discarding the target data unit, where the first target channel resource includes a resource configured by the network side device for the terminal or a resource used to transmit the first data unit;

channel quality of the terminal or channel quality used to transmit the first data unit, where for example, if channel quality is good, channel measurement performance is greater than a preset threshold, and first target channel measurement performance is greater than or equal to a preset threshold, the terminal stops discarding the target data unit, where the first target channel includes a channel of the terminal or a channel used to transmit the first data unit, and the channel quality may be represented by using RSRP, RSRQ, and a SINR;

a size of the first data unit, a size of a PDU corresponding to the first data unit, a size of an SDU corresponding to the first data unit, a size of a BSR corresponding to the first data unit, or a size of an SR corresponding to the first data unit, where for example, if a first target size of the first data unit is less than or equal to a preset threshold, the terminal stops discarding the target data unit, where the first target size includes the size of a first data unit, the size of the PDU corresponding to the first data unit, the size of the SDU corresponding to the first data unit, the size of the BSR corresponding to the first data unit, or the size of the SR corresponding to the first data unit;

a quantity of data packets of a first target data queue of the terminal, where the first target data queue includes a queue of the first data unit or a to-be-transmitted data queue, for example, if the quantity of data packets of the first target data queue of the terminal is less than or equal to a preset threshold, the terminal stops discarding the target data unit, and the first target data queue includes the queue of the first data unit or the to-be-transmitted data queue;

a size of the first target data queue of the terminal, where for example, if a total size of data packets of the first target data queue of the terminal is less than or equal to a preset threshold, the terminal stops discarding the target data unit; and a latency requirement of the terminal or the first data unit, or a PDB requirement of the terminal or the first data unit, where for example, if a first target requirement reaches a preset threshold, the terminal stops discarding the target data unit, and the first target requirement includes the latency requirement of the terminal or the first data unit, or the PDB requirement of the terminal or the first data unit.

In some embodiments, the discarding or reserving the target data unit based on at least one of a priority of the target data unit and a corresponding requirement includes:

in a case that a discard timer corresponding to a plurality of data packets or a plurality of groups expires, or a plurality of data packets or a plurality of groups meet the preset discarding condition, discarding or reserving, by the terminal, the target data unit based on at least one of a priority of the target data unit and a corresponding requirement.

In some embodiments, the discarding or reserving the target data unit based on at least one of a priority of the target data unit and a corresponding requirement includes at least one of the following:

discarding the target data unit that meets a first condition; and reserving the target data unit that meets a second condition, where the first condition includes at least one of the following:

a data unit with a low priority or a lowest priority;

having a priority lower than a preset priority;

a data unit with a low latency requirement or a lowest latency requirement;

having a latency requirement lower than a preset latency requirement;

having a PoD requirement lower than a preset PoD requirement;

a P-frame data unit or a P slice data unit in a service;

a B-frame data unit or a B slice data unit in a service;

an enhanced layer data unit in a service;

a non-Fov frame data unit in a service;

a data unit with a low QoS requirement or a lowest QoS requirement;

having a QoS requirement lower than a preset QoS requirement;

a priority of a QoS flow obtained by mapping being a low priority or being lower than a preset priority; and a priority of an LCH obtained by mapping being a low priority or being lower than a preset priority; and the second condition includes at least one of the following:

a data unit with a high priority or a highest priority;

having a priority higher than a preset priority;

a data unit with a high latency requirement or a highest latency requirement;

having a latency requirement higher than a preset latency requirement;

having a PoD requirement higher than a preset PoD requirement;

an I-frame data unit, an I slice data unit, or an IDR data unit in a service;

a basic layer data unit in a service;

a Fov frame data unit in a service;

a data unit with a high QoS requirement or a highest QoS requirement;

having a QoS requirement higher than a preset QoS requirement;

a priority of a QoS flow obtained by mapping being a high priority or being higher than a preset priority; and a priority of an LCH obtained by mapping being a high priority or being higher than a preset priority.

The foregoing data unit may be a group or a data packet. In this embodiment, a target data unit that meets a first condition is discarded, and a target data unit that meets the second condition is reserved, so that invalid data transmission can be reduced, system resource utilization can be improved, and a transmission delay of a data packet can be reduced.

The first timer may be a discard timer. The discard timer is configured to control discarding of a data packet or a group. For example, when the discard timer corresponding to the data packet or the group expires, the corresponding data packet or group may be discarded.

In some embodiments, the first data unit is a data packet, and the data packet includes at least one of the following:

a PDCP SDU;

a PDCP PDU;

an RLC SDU;

an RLC PDU;

a MAC SDU;

a MAC PDU;

a physical layer data packet, such as a transmission block;

an RRC layer data packet, such as an RRC message;

an SDAP layer PDU;

an SDAP layer SDU;

an IP data packet;

a data packet corresponding to a PDU session;

a data packet corresponding to a QoS flow; and a data packet corresponding to a radio bearer.

In some embodiments, the first data unit is a group, and the group is at least one of the following:

a combination or a set of a plurality of data packets;

a data packet or a data packet set of an upper layer, where the upper layer includes at least one of the following: an application layer, an IP layer, an RRC layer, an SDAP layer, a PDCP layer, an RLC layer, and a MAC layer, and the upper layer is an upper layer of a protocol layer at which a data packet or group is currently located;

a data packet or a data packet set corresponding to a QoS flow;

an I frame, an I slice, or an IDR frame in a service;

a P frame or a P slice in a service;

a B frame or a B slice in a service;

a Fov frame in a service;

a non-Fov frame in a service;

a voice data packet or data packet set in a service;

a video data packet or data packet set or an image data packet or data packet set in a service;

data packets or a data packet set with different priorities in a service;

a data packet or a data packet set corresponding to a basic layer in a service; and a data packet or a data packet set corresponding to an enhanced layer in a service.

In an XR service, a layered model is usually used to divide service data into different layers based on different features. Different layers correspond to different requirements, such as a QoS requirement and a degree of importance. The different layers are, for example:

an I frame or a P frame in the XR service or a CG service;

an Fov frame or a non-Fov frame in the XR or CG service;

a voice data packet or a video image data packet in the XR or CG service;

data packets having different priorities defined in the XR or CG service; and a data packet corresponding to a basic layer or an enhanced layer in the XR or CG service.

There may be associations or dependencies between these same-layer or different-layer data packets. Therefore, the technical solution of the embodiments may be applied to the XR or CG service, and the foregoing different groups include different groups of a same type or different groups of different types.

It should be noted that, the data transmission method provided in this embodiment of this application may be performed by a data transmission apparatus or a module that is in the data transmission apparatus and that is configured to load the data transmission method. In this embodiment of this application, the data transmission method provided in the embodiments of this application is described by using an example in which the data transmission apparatus executes and loads the data transmission method.

Figure 3:
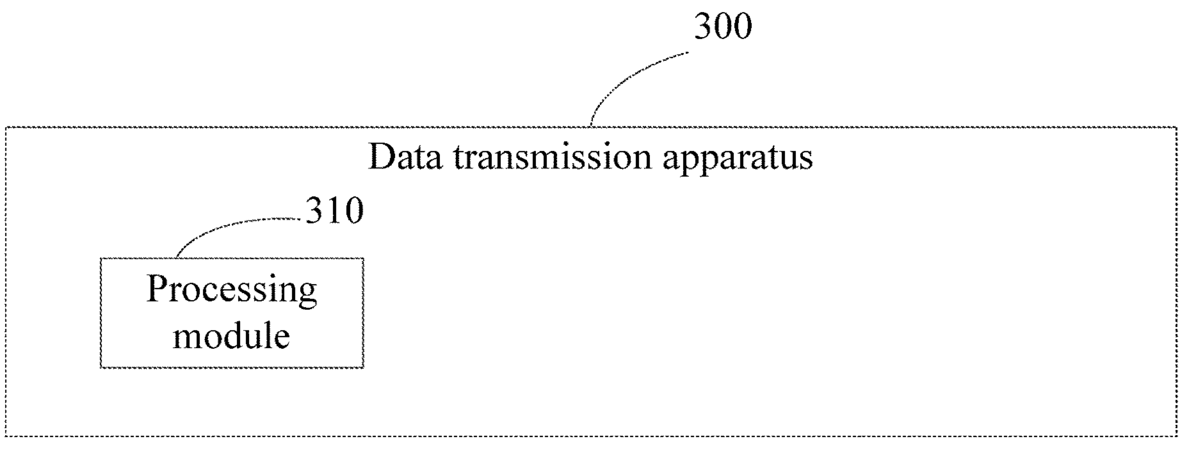
FIG. 3 is a schematic structural diagram of a data transmission apparatus according to an embodiment of this application.

An embodiment of this application provides a data transmission apparatus 300, applied to a terminal. As shown in FIG. 3, the apparatus includes:

a processing module 310, configured to: in a case that a first data unit or a terminal meets a preset discarding condition, discard a target data unit, or discard or reserve the target data unit based on at least one of a priority of the target data unit and a corresponding requirement, where the target data unit includes a first data unit and/or a data unit associated with the first data unit.

In some embodiments, the preset discarding condition includes at least one of the following:

a first timer expiring;

the first data unit being a data unit in a first target-type group or the first data unit being a first target-type group;

the first data unit being a first target-type data packet or the first data unit being a group to which a first target-type data packet belongs;

receiving, by the terminal, a first indication configured by a network side device or indicated by a first protocol layer, where the first protocol layer includes at least one of the following: an application layer, an IP layer, an RRC layer, an SDAP layer, a PDCP layer, an RLC layer, and a MAC layer;

a priority of the first data unit, a priority of a PDU corresponding to the first data unit, or a priority of an SDU corresponding to the first data unit being lower than a preset first threshold;

the first data unit being successfully transmitted; and determining, by the terminal based on first target information, that the first data unit needs to be discarded, where the first target information is used to indicate at least one of the following:

whether the terminal supports carrier aggregation CA or dual connectivity DC;

whether carrier aggregation CA or dual connectivity DC is configured for the terminal;

whether carrier aggregation CA or dual connectivity DC is activated for the terminal;

a resource configured by the network side device for the terminal or a resource used to transmit the first data unit;

memory or cache space of the terminal;

a capability of the terminal;

channel quality of the terminal or channel quality used to transmit the first data unit;

a size of the first data unit, a size of a PDU corresponding to the first data unit, a size of an SDU corresponding to the first data unit, a size of a BSR corresponding to the first data unit, or a size of an SR corresponding to the first data unit;

a queue of the first data unit or a to-be-transmitted data queue of the terminal; and a size of a queue of the first data unit or a size of a to-be-transmitted data queue of the terminal;

a latency requirement of the terminal or the first data unit; or a PDB requirement of the terminal or the first data unit;

a packet error rate of the first data unit, a packet error rate of a PDU corresponding to the first data unit, or a packet error rate of an SDU corresponding to the first data unit; and a latency of the target data unit, a latency of a PDU corresponding to the target data unit, or a latency of an SDU corresponding to the target data unit.

In some embodiments, the preset discarding condition is configured by a network side device or indicated by a first protocol layer, where the first protocol layer includes at least one of the following: an application layer, an IP layer, an RRC layer, an SDAP layer, a PDCP layer, an RLC layer, a MAC layer, and a physical PHY layer.

In some embodiments, the first data unit is a first data packet or a first group, and a data packet associated with the first data unit includes at least one of the following:

at least some data packets in the first group, where the first group is a group in which the first data packet is located;

at least some data packets associated with the first data packet or the first group; and at least some data packets in a second group, where the second group is associated with the first data packet or the first group.

In some embodiments, the first data unit is a first data packet or a first group, and a data packet associated with the first data unit includes at least one of the following:

at least some data packets corresponding to the first timer;

at least some data packets associated with a fifth data packet, where the fifth data packet corresponds to the first timer;

at least some data packets in a fifth group, where the fifth group corresponds to the first timer; and at least some data packets in a sixth group associated with the fifth group.

In some embodiments, the first data unit is a first data packet or a first group, and a group associated with the first data unit includes at least one of the following:

a first group, where the first group is a group in which the first data packet is located;

a group in which a second data packet is located, where the second data packet is associated with the first data packet or the first group; and a group associated with the first group.

In some embodiments, the first data unit is a first data packet or a first group, and a group associated with the first data unit includes at least one of the following:

a group corresponding to the first timer;

a group associated with a fifth group, where the fifth group corresponds to the first timer; and a group in which a data packet corresponding to the first timer is located; and a group associated with the data packet corresponding to the first timer.

In some embodiments, the first target-type group meets at least one of the following:

the first target-type group being a low-priority group;

the first target-type group being not a high-priority group;

a priority of the first target-type group being lower than a preset priority;

the first target-type group being not a low latency requirement group;

a latency requirement of the first target-type group being lower than a preset latency requirement;

a PoD requirement of the first target-type group being lower than a preset PoD requirement;

the first target-type group being a P-frame group or a P slice in a service;

the first target-type group being a B-frame group or a B slice in a service;

the first target-type group being an enhanced layer group in a service;

the first target-type group being a non-Fov frame group in a service;

the first target-type group being a low QoS requirement group;

a QoS requirement of the first target-type group being lower than a preset QoS requirement;

a priority of a QoS flow mapped by the first target-type group being a low priority or being lower than a preset priority;

a priority of an LCH mapped by the first target-type group being a low priority or being lower than a preset priority;

at least some data units in the first target-type group not having an association with another data unit in the first target-type group;

the another data unit not depending on at least some data units in the first target-type group;

at least some data packets or a group associated with the first target-type group having been successfully transmitted;

at least some data packets or a group that depends on the first target-type group having been successfully transmitted;

at least some data packets in the first target-type group having been successfully transmitted;

the first target-type group being a group in which the first target-type data packet is located;

a group associated with the first target-type data packet; and a group that depends on the first target-type data packet.

In some embodiments, the preset discarding condition further includes at least one of the following:

the first data unit being a data unit associated with the first target-type group; and the first data unit being a data unit that depends on the first target-type group.

In some embodiments, the first target-type data packet meets at least one of the following:

the first target-type data packet being a data packet in the first target-type group;

the first target-type data packet being associated with the first target-type group;

the first target-type data packet depending on the first target-type group;

a data packet in a group associated with the first target-type group;

a data packet in a group that depends on the first target-type group;

a priority of the first target-type data packet being a low-priority data packet;

the priority of the first target-type data packet being lower than a preset priority;

a latency requirement of the first target-type data packet being a low latency requirement;

the latency requirement of the first target-type data packet being lower than a preset latency requirement;

a PoD requirement of the first target-type group being lower than a preset PoD requirement;

the first target-type data packet being a P-frame data packet or a P slice data packet in a service;

the first target-type data packet being a B-frame data packet or a B slice data packet in a service;

the first target-type data packet being an enhanced layer data packet in a service;

the first target-type data packet being a non-Fov frame data packet in a service;

a QoS requirement of the first target-type data packet being a low QoS requirement;

the QoS requirement of the first target-type data packet being lower than a preset QoS requirement;

a priority of a QoS flow mapped by the first target-type data packet being a low priority or being lower than a preset priority;

a priority of an LCH mapped by the first target-type data packet being a low priority or being lower than a preset priority;

at least some data packets in the first target-type data packet not having an association with another data packet in the first target-type group;

the another data packet not depending on at least some data packets in the first target-type data packet;

at least some data packets or a group associated with the first target-type data packet having been successfully transmitted;

at least some data packets or a group that depends on the first target-type data packet having been successfully transmitted; and at least some data packets in the first target-type data packet having been successfully transmitted.

In some embodiments, the preset discarding condition further includes at least one of the following:

the first data unit being a data packet associated with the first target-type data packet;

the first data unit being a data packet that depends on the first target-type data packet;

the first data unit being a data packet in a group associated with the first target-type data packet; and the first data unit being a data packet in a group that depends on the first target-type data packet.

In some embodiments, the first indication is used to indicate at least one of the following:

discarding the target data unit based on second target information; and discarding the target data unit based on no association or dependency.

In some embodiments, the second target information is used to indicate at least one of the following:

memory or cache space of the terminal;

a capability of the terminal;

whether the terminal supports carrier aggregation CA or dual connectivity DC;

whether carrier aggregation CA or dual connectivity DC is configured or activated for the terminal;

a resource configured by the network side device for the terminal or a resource used to transmit the first data unit;

channel quality of the terminal or channel quality used to transmit the first data unit;

a size of the first data unit, a size of a PDU corresponding to the first data unit, a size of an SDU corresponding to the first data unit, a size of a BSR corresponding to the first data unit, or a size of an SR corresponding to the first data unit;

a quantity of data packets of a first target data queue of the terminal, where the first target data queue includes a queue of the first data unit or a to-be-transmitted data queue;

a size of the first target data queue of the terminal;

a latency requirement of the terminal or the first data unit; and a PDB requirement of the terminal or the first data unit.

In some embodiments, the processing module 310 is specifically configured to: in a case that a discard timer corresponding to a plurality of data packets or a plurality of groups expires, or a plurality of data packets or a plurality of groups meet the preset discarding condition, discard or reserve the target data unit based on a priority of the target data unit and/or a corresponding requirement.

In some embodiments, the processing module 310 is specifically configured to perform at least one of the following:

discarding the target data unit that meets a first condition; and reserving the target data unit that meets a second condition, where the first condition includes at least one of the following:

a data unit with a low priority or a lowest priority;

having a priority lower than a preset priority;

a data unit with a low latency requirement or a lowest latency requirement;

having a latency requirement lower than a preset latency requirement;

having a PoD requirement lower than a preset PoD requirement;

a P-frame data unit or a P slice data unit in a service;

a B-frame data unit or a B slice data unit in a service;

an enhanced layer data unit in a service;

a non-Fov frame data unit in a service;

a data unit with a low QoS requirement or a lowest QoS requirement;

having a QoS requirement lower than a preset QoS requirement;

a priority of a QoS flow obtained by mapping being a low priority or being lower than a preset priority; and a priority of an LCH obtained by mapping being a low priority or being lower than a preset priority; and the second condition includes at least one of the following:

a data unit with a high priority or a highest priority;
having a priority higher than a preset priority;
a data unit with a high latency requirement or a highest latency requirement;
having a latency requirement higher than a preset latency requirement;
having a PoD requirement higher than a preset PoD requirement;
an I-frame data unit, an I slice data unit, or an IDR data unit in a service;
a basic layer data unit in a service;
a Fov frame data unit in a service;
a data unit with a high QoS requirement or a highest QoS requirement;
having a QoS requirement higher than a preset QoS requirement;
a priority of a QoS flow obtained by mapping being a high priority or being higher than a preset priority; and
a priority of an LCH obtained by mapping being a high priority or being higher than a preset priority.

In some embodiments, the first timer is a discard timer.

In some embodiments, the first data unit is a data packet, and the data packet includes at least one of the following:
a PDCP SDU;
a PDCP PDU;
an RLC SDU;
an RLC PDU;
a MAC SDU;
a MAC PDU;
a physical layer data packet;
an RRC layer data packet;
an SDAP layer PDU;
an SDAP layer SDU;
an IP data packet package;
a data packet corresponding to a PDU session;
a data packet corresponding to a QoS flow; and
a data packet corresponding to a radio bearer.

In some embodiments, the first data unit is a group, and the group is at least one of the following:
a combination or a set of a plurality of data packets;
a data packet or a data packet set of an upper layer, where the upper layer includes at least one of the following: an application layer, an IP layer, an RRC layer, an SDAP layer, a PDCP layer, an RLC layer, and a MAC layer;
a data packet or a data packet set corresponding to a QoS flow;
an I frame, an I slice, or an IDR frame in a service;
a P frame or a P slice in a service;
a B frame or a B slice in a service;
a Fov frame in a service;
a non-Fov frame in a service;
a voice data packet or data packet set in a service;
a video data packet or data packet set or an image data packet or data packet set in a service;
data packets or a data packet set with different priorities in a service;
a data packet or a data packet set corresponding to a basic layer in a service; and
a data packet or a data packet set corresponding to an enhanced layer in a service.

The data transmission apparatus in this embodiment of this application may be an apparatus, an apparatus or an electronic device with an operating system, or a component, an integrated circuit, or a chip in a terminal. The apparatus or electronic device may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The data transmission apparatus provided in this embodiment of this application can implement the processes implemented in the method embodiment in FIG. 2, with a same technical effect achieved. To avoid repetition, details are not described herein again.

Figure 4:
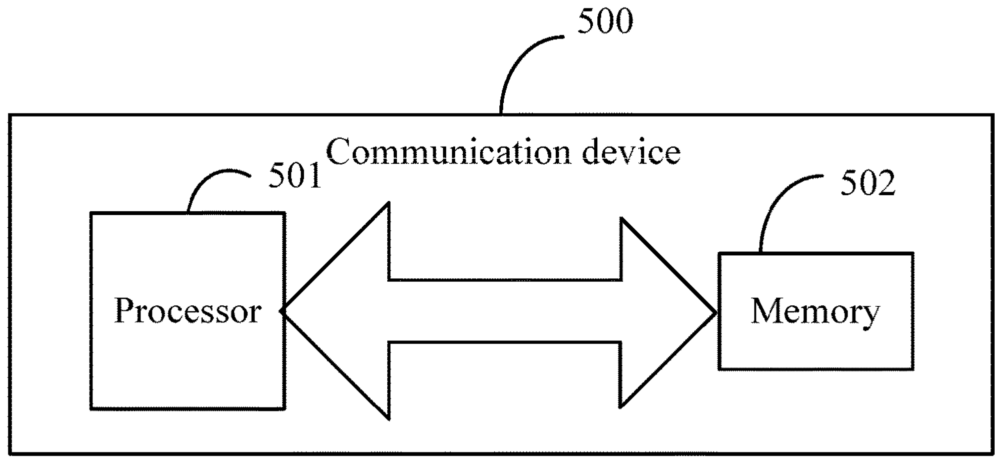
FIG. 4 is a schematic structural diagram of a communication device according to an embodiment of this application.

Optionally, as shown in FIG. 4, an embodiment of this application further provides a communication device 500, including a processor 501, a memory 502, and a program or an instruction that is stored in the memory 502 and that can run on the processor 501. For example, when the communication device 500 is a terminal, the program or the instruction is executed by the processor 501 to implement the processes of the foregoing embodiment of the data transmission method applied to the terminal, and a same technical effect can be achieved.

Figure 5:
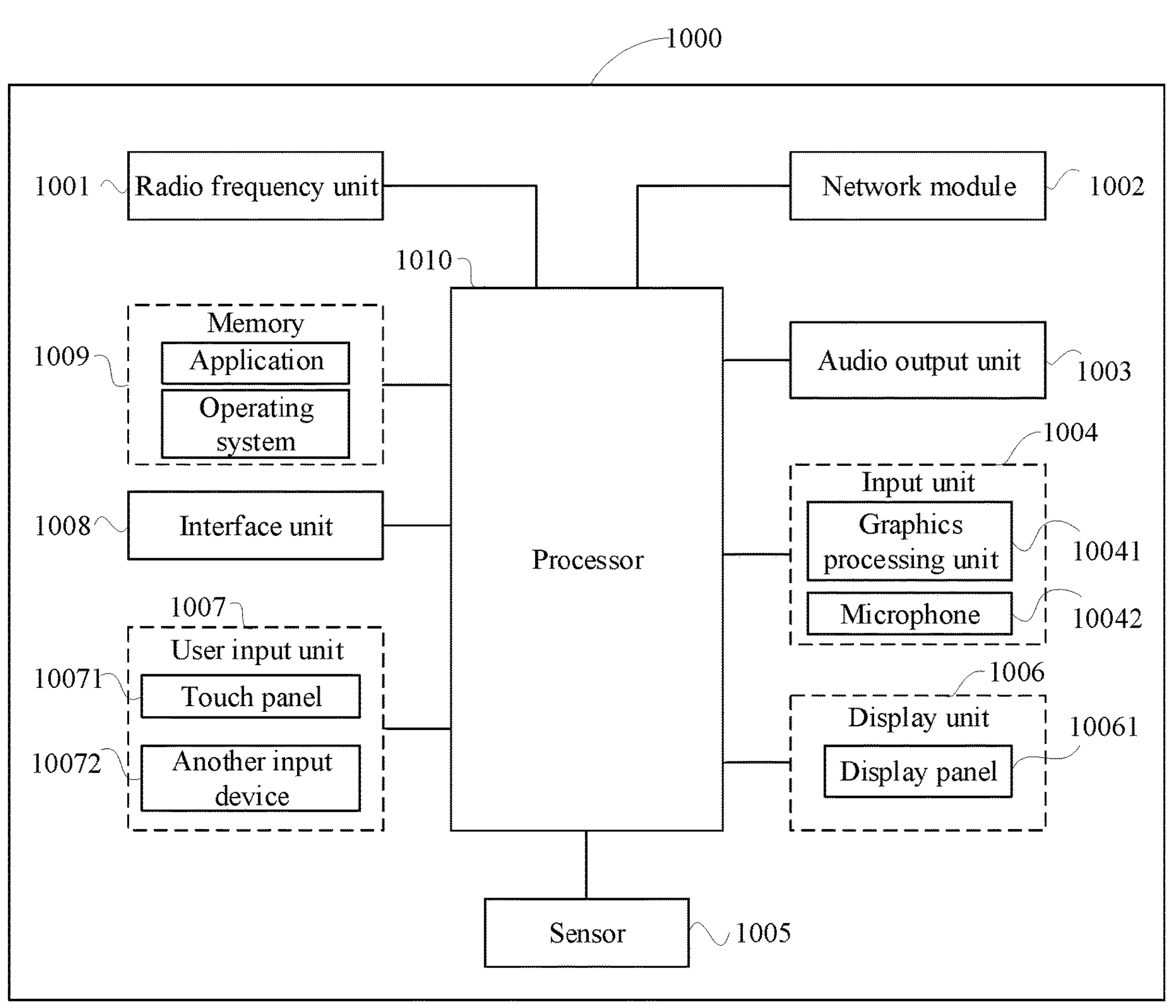
FIG. 5 is a schematic diagram of composition of a terminal according to an embodiment of this application.

An embodiment of this application further provides a terminal, including a processor and a communication interface. The processor is configured to: in a case that a first data unit or a terminal meets a preset discarding condition, discard a target data unit, or discard or reserve the target data unit based on at least one of a priority of the target data unit and a corresponding requirement, where the target data unit includes a first data unit and/or a data unit associated with the first data unit. This terminal embodiment corresponds to the foregoing method embodiment on the terminal side. Each implementation process and implementation of the foregoing method embodiment may be applicable to this terminal embodiment, and a same technical effect can be achieved. Specifically, FIG. 5 is a schematic diagram of a hardware structure of a terminal according to an embodiment of this application.

A terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (such as a battery) that supplies power to each component. The power supply may be logically connected to the processor 1010 by using a power supply management system, to implement functions such as charging and discharging management, and power consumption management by using the power supply management system. The terminal structure shown in FIG. 5 constitutes no limitation on the terminal, and the terminal may include more or fewer components than those shown in the figure, or combine some components, or have different component arrangements. Details are not described herein.

It should be understood that, in the embodiments of this application, the input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061. The display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, the radio frequency unit 1001 receives downlink data from a network side device and then sends the downlink data to the processor 1010 for processing; and sends uplink data to the network side device. Usually, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, an application or an instruction required by at least one function (for example, a sound playing function or an image playing function), and the like. In addition, the memory 1009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 1010 may include one or more processing units. Optionally, an application processor and a modem processor may be integrated into the processor 1010. The application processor mainly processes an operating system, a user interface, an application, an instruction, or the like. The modem processor mainly processes wireless communication, for example, a baseband processor. It may be understood that, alternatively, the modem processor may not be integrated into the processor 1010.

The processor 1010 is configured to: in a case that a first data unit or a terminal meets a preset discarding condition, discard a target data unit, or discard or reserve the target data unit based on at least one of a priority of the target data unit and a corresponding requirement, where the target data unit includes a first data unit and/or a data unit associated with the first data unit.

In some embodiments, the preset discarding condition includes at least one of the following:

a first timer expiring;

the first data unit being a data unit in a first target-type group or the first data unit being a first target-type group;

the first data unit being a first target-type data packet or the first data unit being a group to which a first target-type data packet belongs;

receiving, by the terminal, a first indication configured by a network side device or indicated by a first protocol layer, where the first protocol layer includes at least one of the following: an application layer, an IP layer, an RRC layer, an SDAP layer, a PDCP layer, an RLC layer, and a MAC layer;

a priority of the first data unit, a priority of a PDU corresponding to the first data unit, or a priority of an SDU corresponding to the first data unit being lower than a preset first threshold;

the first data unit being successfully transmitted; and determining, by the terminal based on first target information, that the first data unit needs to be discarded, where the first target information is used to indicate at least one of the following:

whether the terminal supports carrier aggregation CA or dual connectivity DC;

whether carrier aggregation CA or dual connectivity DC is configured for the terminal;

whether carrier aggregation CA or dual connectivity DC is activated for the terminal;

a resource configured by the network side device for the terminal or a resource used to transmit the first data unit;

memory or cache space of the terminal;

a capability of the terminal;

channel quality of the terminal or channel quality used to transmit the first data unit;

a size of the first data unit, a size of a PDU corresponding to the first data unit, a size of an SDU corresponding to the first data unit, a size of a BSR corresponding to the first data unit, or a size of an SR corresponding to the first data unit;

a queue of the first data unit or a to-be-transmitted data queue of the terminal; and a size of a queue of the first data unit or a size of a to-be-transmitted data queue of the terminal;

a latency requirement of the terminal or the first data unit; or a PDB requirement of the terminal or the first data unit;

a packet error rate of the first data unit, a packet error rate of a PDU corresponding to the first data unit, or a packet error rate of an SDU corresponding to the first data unit; and a latency of the target data unit, a latency of a PDU corresponding to the target data unit, or a latency of an SDU corresponding to the target data unit.

In some embodiments, the preset discarding condition is configured by a network side device or indicated by a first protocol layer, where the first protocol layer includes at least one of the following: an application layer, an IP layer, an RRC layer, an SDAP layer, a PDCP layer, an RLC layer, a MAC layer, and a physical PHY layer.

In some embodiments, the first data unit is a first data packet or a first group, and a data packet associated with the first data unit includes at least one of the following:

at least some data packets in the first group, where the first group is a group in which the first data packet is located;

at least some data packets associated with the first data packet or the first group; and at least some data packets in a second group, where the second group is associated with the first data packet or the first group.

In some embodiments, the first data unit is a first data packet or a first group, and a data packet associated with the first data unit includes at least one of the following:

at least some data packets corresponding to the first timer;

at least some data packets associated with a fifth data packet, where the fifth data packet corresponds to the first timer;

at least some data packets in a fifth group, where the fifth group corresponds to the first timer; and at least some data packets in a sixth group associated with the fifth group.

In some embodiments, the first data unit is a first data packet or a first group, and a group associated with the first data unit includes at least one of the following:

a first group, where the first group is a group in which the first data packet is located;

a group in which a second data packet is located, where the second data packet is associated with the first data packet or the first group; and a group associated with the first group.

In some embodiments, the first data unit is a first data packet or a first group, and a group associated with the first data unit includes at least one of the following:

a group corresponding to the first timer;

a group associated with a fifth group, where the fifth group corresponds to the first timer; and a group in which a data packet corresponding to the first timer is located; and a group associated with the data packet corresponding to the first timer.

In some embodiments, the first target-type group meets at least one of the following:

the first target-type group being a low-priority group;

the first target-type group being not a high-priority group;

a priority of the first target-type group being lower than a preset priority;

the first target-type group being not a low latency requirement group;

a latency requirement of the first target-type group being lower than a preset latency requirement;

a PoD requirement of the first target-type group being lower than a preset PoD requirement;

the first target-type group being a P-frame group or a P slice in a service;

the first target-type group being a B-frame group or a B slice in a service;

the first target-type group being an enhanced layer group in a service;

the first target-type group being a non-Fov frame group in a service;

the first target-type group being a low QoS requirement group;

a QoS requirement of the first target-type group being lower than a preset QoS requirement;

a priority of a QoS flow mapped by the first target-type group being a low priority or being lower than a preset priority;

a priority of an LCH mapped by the first target-type group being a low priority or being lower than a preset priority;

at least some data units in the first target-type group not having an association with another data unit in the first target-type group;

the another data unit not depending on at least some data units in the first target-type group;

at least some data packets or a group associated with the first target-type group having been successfully transmitted;

at least some data packets or a group that depends on the first target-type group having been successfully transmitted;

at least some data packets in the first target-type group having been successfully transmitted;

the first target-type group being a group in which the first target-type data packet is located;

a group associated with the first target-type data packet; and a group that depends on the first target-type data packet.

In some embodiments, the preset discarding condition further includes at least one of the following:

the first data unit being a data unit associated with the first target-type group; and the first data unit being a data unit that depends on the first target-type group.

In some embodiments, the first target-type data packet meets at least one of the following:

the first target-type data packet being a data packet in the first target-type group;

the first target-type data packet being associated with the first target-type group;

the first target-type data packet depending on the first target-type group;

a data packet in a group associated with the first target-type group;

a data packet in a group that depends on the first target-type group;

a priority of the first target-type data packet being a low-priority data packet;

the priority of the first target-type data packet being lower than a preset priority;

a latency requirement of the first target-type data packet being a low latency requirement;

the latency requirement of the first target-type data packet being lower than a preset latency requirement;

a PoD requirement of the first target-type group being lower than a preset PoD requirement;

the first target-type data packet being a P-frame data packet or a P slice data packet in a service;

the first target-type data packet being a B-frame data packet or a B slice data packet in a service;

the first target-type data packet being an enhanced layer data packet in a service;

the first target-type data packet being a non-Fov frame data packet in a service;

a QoS requirement of the first target-type data packet being a low QoS requirement;

the QoS requirement of the first target-type data packet being lower than a preset QoS requirement;

a priority of a QoS flow mapped by the first target-type data packet being a low priority or being lower than a preset priority;

a priority of an LCH mapped by the first target-type data packet being a low priority or being lower than a preset priority;

at least some data packets in the first target-type data packet not having an association with another data packet in the first target-type group;

the another data packet not depending on at least some data packets in the first target-type data packet;

at least some data packets or a group associated with the first target-type data packet having been successfully transmitted;

at least some data packets or a group that depends on the first target-type data packet having been successfully transmitted; and at least some data packets in the first target-type data packet having been successfully transmitted.

In some embodiments, the preset discarding condition further includes at least one of the following:

the first data unit being a data packet associated with the first target-type data packet;

the first data unit being a data packet that depends on the first target-type data packet;

the first data unit being a data packet in a group associated with the first target-type data packet; and the first data unit being a data packet in a group that depends on the first target-type data packet.

In some embodiments, the first indication is used to indicate at least one of the following:

discarding the target data unit based on second target information; and discarding the target data unit based on no association or dependency.

In some embodiments, the second target information is used to indicate at least one of the following:

memory or cache space of the terminal;

a capability of the terminal;

whether the terminal supports carrier aggregation CA or dual connectivity DC;

whether carrier aggregation CA or dual connectivity DC is configured or activated for the terminal;

a resource configured by the network side device for the terminal or a resource used to transmit the first data unit;

channel quality of the terminal or channel quality used to transmit the first data unit;

a size of the first data unit, a size of a PDU corresponding to the first data unit, a size of an SDU corresponding to the first data unit, a size of a BSR corresponding to the first data unit, or a size of an SR corresponding to the first data unit;

a quantity of data packets of a first target data queue of the terminal, where the first target data queue includes a queue of the first data unit or a to-be-transmitted data queue;

a size of the first target data queue of the terminal;

a latency requirement of the terminal or the first data unit; and a PDB requirement of the terminal or the first data unit.

In some embodiments, the processor 1010 is specifically configured to: in a case that a discard timer corresponding to a plurality of data packets or a plurality of groups expires, or a plurality of data packets or a plurality of groups meet the preset discarding condition, discard or reserve the target data unit based on a priority of the target data unit and/or a corresponding requirement.

In some embodiments, the processor 1010 is specifically configured to perform at least one of the following:

discarding the target data unit that meets a first condition; and reserving the target data unit that meets a second condition, where the first condition includes at least one of the following:

a data unit with a low priority or a lowest priority;

having a priority lower than a preset priority;

a data unit with a low latency requirement or a lowest latency requirement;

having a latency requirement lower than a preset latency requirement;

having a PoD requirement lower than a preset PoD requirement;

a P-frame data unit or a P slice data unit in a service;

a B-frame data unit or a B slice data unit in a service;

an enhanced layer data unit in a service;

a non-Fov frame data unit in a service;

a data unit with a low QoS requirement or a lowest QoS requirement;

having a QoS requirement lower than a preset QoS requirement;

a priority of a QoS flow obtained by mapping being a low priority or being lower than a preset priority; and a priority of an LCH obtained by mapping being a low priority or being lower than a preset priority; and the second condition includes at least one of the following:

a data unit with a high priority or a highest priority;

having a priority higher than a preset priority;

a data unit with a high latency requirement or a highest latency requirement;

having a latency requirement higher than a preset latency requirement;

having a PoD requirement higher than a preset PoD requirement;

an I-frame data unit, an I slice data unit, or an IDR data unit in a service;

a basic layer data unit in a service;

a Fov frame data unit in a service;

a data unit with a high QoS requirement or a highest QoS requirement;

having a QoS requirement higher than a preset QoS requirement;

a priority of a QoS flow obtained by mapping being a high priority or being higher than a preset priority; and a priority of an LCH obtained by mapping being a high priority or being higher than a preset priority.

In some embodiments, the first timer is a discard timer.

In some embodiments, the first data unit is a data packet, and the data packet includes at least one of the following:

a PDCP SDU;

a PDCP PDU;

an RLC SDU;

an RLC PDU;

a MAC SDU;

a MAC PDU;

a physical layer data packet;

an RRC layer data packet;

an SDAP layer PDU;

an SDAP layer SDU;

an IP data packet package;

a data packet corresponding to a PDU session;

a data packet corresponding to a QoS flow; and a data packet corresponding to a radio bearer.

In some embodiments, the first data unit is a group, and the group is at least one of the following:

a combination or a set of a plurality of data packets;

a data packet or a data packet set of an upper layer, where the upper layer includes at least one of the following: an application layer, an IP layer, an RRC layer, an SDAP layer, a PDCP layer, an RLC layer, and a MAC layer;

a data packet or a data packet set corresponding to a QoS flow;

an I frame, an I slice, or an IDR frame in a service;

a P frame or a P slice in a service;

a B frame or a B slice in a service;

a Fov frame in a service;

a non-Fov frame in a service;

a voice data packet or data packet set in a service;

a video data packet or data packet set or an image data packet or data packet set in a service;

data packets or a data packet set with different priorities in a service;

a data packet or a data packet set corresponding to a basic layer in a service; and a data packet or a data packet set corresponding to an enhanced layer in a service.

An embodiment of this application further provides a readable storage medium. The readable storage medium may be volatile or non-volatile. The readable storage medium stores a program or an instruction, and the program or the instruction is executed by a processor to implement the processes of the foregoing data transmission method embodiment, and a same technical effect can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing data transmission method embodiment, and a same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application further provides a computer program/program product. The computer program/program product is stored in a non-transient storage medium, and the computer program/program product is executed by at least one processor to implement the processes of the foregoing data transmission method embodiment, and a same technical effect can be achieved. To avoid repetition, details are not described herein again.

It should be noted that, in this specification, the term “include”, “include”, or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the related art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A data transmission method, comprising:

in a case that a first data unit meets a preset discarding condition, discarding, by a terminal, a target data unit, wherein the first data unit is a first data packet, and the target data unit is a data packet within a first target-type group;

wherein the preset discarding condition comprises both a discard timer corresponding to the first data packet expiring and a priority of the first target-type group associated with the first data packet being lower than a preset priority; and wherein the first data packet is a data packet associated with a first target-type data packet, and the first target-type group is a data packet set to which the first target-type data packet belongs.

2. The data transmission method according to claim 1, wherein the preset discarding condition is configured by a network side device or indicated by a first protocol layer on a terminal side, wherein the first protocol layer comprises at least one of the following: an application layer, an IP layer, an RRC layer, an SDAP layer, a PDCP layer, an RLC layer, a MAC layer, or a physical (PHY) layer.

3. The data transmission method according to claim 1, wherein the first data packet comprises a PDCP SDU.

4. A terminal, comprising a processor, a memory, and a program or an instruction stored in the memory and executable on the processor, wherein the program or the instruction, when executed by the processor, causes the terminal to perform:

in a case that a first data unit meets a preset discarding condition, discarding a target data unit, wherein the first data unit is a first data packet, and the target data unit is a data packet within a first target-type group;

wherein the preset discarding condition comprises both a discard timer corresponding to the first data packet expiring and a priority of the first target-type group associated with the first data packet being lower than a preset priority; and wherein the first data packet is a data packet associated with a first target-type data packet, and the first target-type group is a data packet set to which the first target-type data packet belongs.

5. A non-transitory readable storage medium, wherein the non-transitory readable storage medium stores a program or an instruction, wherein the program or the instruction, when executed by a processor of a terminal, causes the terminal to perform:

in a case that a first data unit meets a preset discarding condition, discarding a target data unit, wherein the first data unit is a first data packet, and the target data unit is a data packet within a first target-type group;

wherein the preset discarding condition comprises both a discard timer corresponding to the first data packet expiring and a priority of the first target-type group associated with the first data packet being lower than a preset priority; and wherein the first data packet is a data packet associated with a first target-type data packet, and the first target-type group is a data packet set to which the first target-type data packet belongs.

6. The terminal according to claim 4, wherein the preset discarding condition is configured by a network side device or indicated by a first protocol layer on a terminal side, wherein the first protocol layer comprises at least one of the following: an application layer, an IP layer, an RRC layer, an SDAP layer, a PDCP layer, an RLC layer, a MAC layer, or a physical (PHY) layer.

7. The terminal according to claim 4, the first data packet comprises a PDCP SDU.

8. The non-transitory readable storage medium according to claim 5, wherein the preset discarding condition is configured by a network side device or indicated by a first protocol layer on a terminal side, wherein the first protocol layer comprises at least one of the following: an application layer, an IP layer, an RRC layer, an SDAP layer, a PDCP layer, an RLC layer, a MAC layer, or a physical (PHY) layer.

9. The non-transitory readable storage medium according to claim 5, the first data packet comprises a PDCP SDU.

* * * * *